United States Patent [19]

Kronschnabel

[11] Patent Number: 4,457,064
[45] Date of Patent: Jul. 3, 1984

[54] APPARATUS FOR GRINDING OFF THE OUTER SHELL OF A SPHERICAL BODY

[75] Inventor: Hartmut Kronschnabel, Aachen, Fed. Rep. of Germany

[73] Assignee: Kernforschungsanlage Jülich GmbH, Jülich, Fed. Rep. of Germany

[21] Appl. No.: 385,094

[22] Filed: Jun. 4, 1982

[30] Foreign Application Priority Data

Jun. 13, 1981 [DE] Fed. Rep. of Germany ....... 3123551

[51] Int. Cl.³ ............................................. B23P 23/00
[52] U.S. Cl. .................... 29/564.7; 29/400 N; 29/148.4 B; 51/289 S; 241/261.3; 409/139
[58] Field of Search ............... 241/296, 247, 250, 248, 241/261.2, 261.3; 51/117, 289 S, 130; 409/138, 139; 29/148.4 B, 400 N, 564.7; 137/268

[56] References Cited

U.S. PATENT DOCUMENTS

| 223,166 | 12/1879 | Raymond | 241/296 |
|---|---|---|---|
| 602,365 | 4/1898 | Schulze | 51/130 |
| 1,419,078 | 6/1922 | Rockwell | 51/130 |
| 1,921,686 | 8/1933 | Matteson | 51/130 |
| 2,044,480 | 6/1936 | Lord | 241/246 |
| 2,758,360 | 8/1956 | Shetler | 29/148.4 B |
| 2,764,851 | 10/1956 | Dieterichs | 51/130 |
| 3,580,539 | 5/1971 | Scoy | 137/268 |
| 3,660,880 | 5/1972 | Glenn | 29/148.4 B |
| 3,761,027 | 9/1973 | Mendoza | 241/296 X |
| 3,791,083 | 2/1974 | Messerschmidt | 51/289 S X |

FOREIGN PATENT DOCUMENTS

| 653414 | 12/1962 | Canada | 241/296 |
|---|---|---|---|
| 760469 | 10/1956 | United Kingdom | 51/130 |
| 825030 | 12/1959 | United Kingdom | 51/130 |
| 994145 | 2/1965 | United Kingdom | 51/130 |
| 986187 | 3/1965 | United Kingdom | 51/130 |
| 1212492 | 11/1970 | United Kingdom | 51/130 |
| 743846 | 6/1980 | U.S.S.R. | 51/130 |

Primary Examiner—William R. Briggs
Assistant Examiner—Glenn L. Webb
Attorney, Agent, or Firm—Frishauf, Holtz, Goodman & Woodward

[57] ABSTRACT

Spent nuclear fuel elements of spherical shape are stripped of their outer graphite shell surrounding the graphite matrix in which fuel particles are embedded by being admitted one by one to a work space between a rotary milling disk and an axially shiftable, but non-rotary, reaction disk. The radially ribbed stepped surfaces of low-pitched helical configuration allow the spherical body to shift its position several times per revolution as it rolls around between the disks under pressure from a spring acting on the axially movable disk. A spacing collar prevents the two disks from approaching closer than a minimum spacing sufficient to prevent more than the outer graphite shell to be worn away. By operating the work space with two or more spheres therein at the same time, a damaged or out-of-round fuel element can be ground to a spherical shape if at least one of the spheres in the work space is truly spherical. Pairs of disks may be operated together in coaxial alignment to provide a high throughput rate. The graphite grindings are usable for making new fuel elements.

26 Claims, 4 Drawing Figures

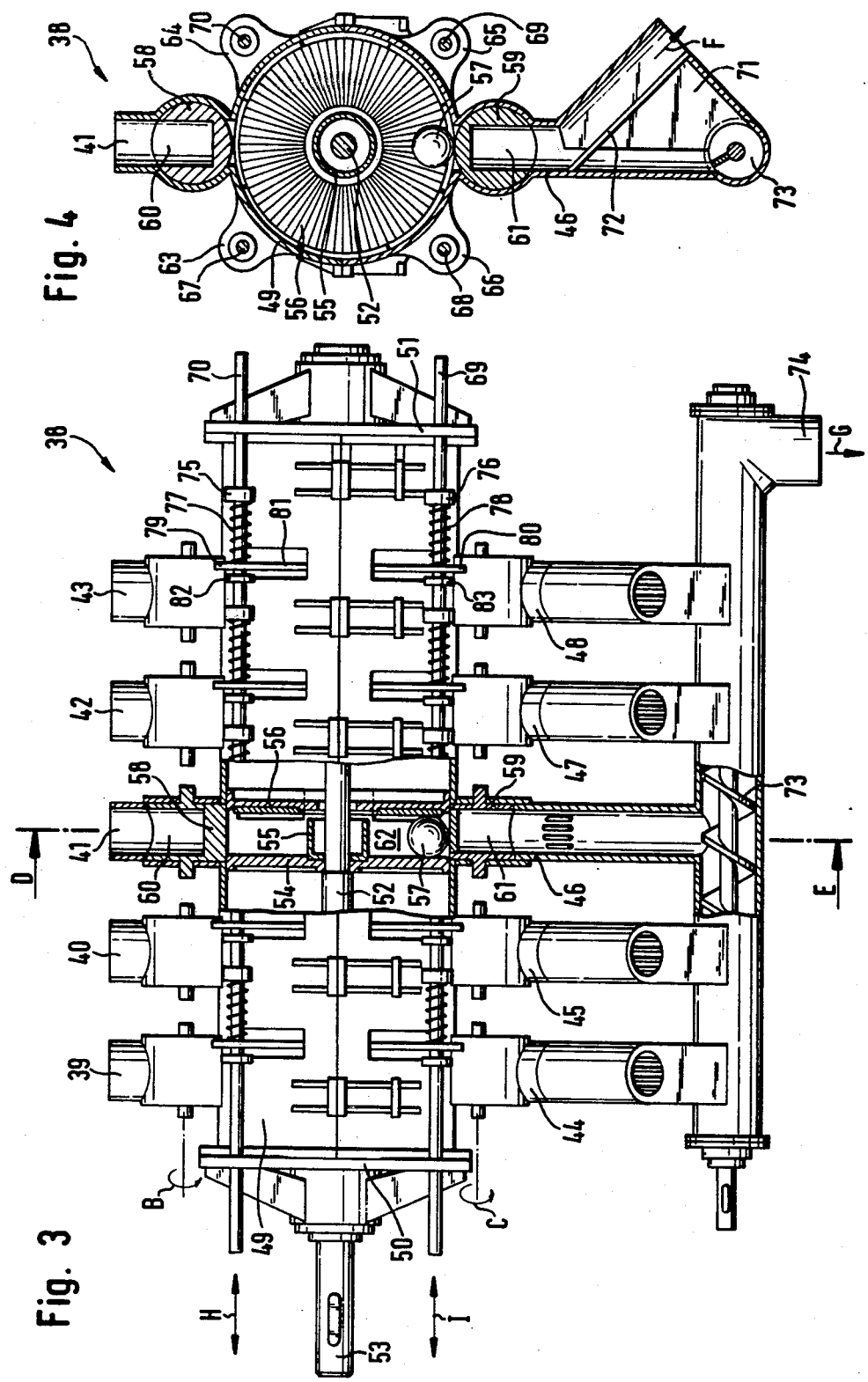

APPARATUS FOR GRINDING OFF THE OUTER SHELL OF A SPHERICAL BODY

This invention concerns an apparatus for grinding off the outer portion of spherical bodies of not more than moderate hardness, particularly for grinding off the fuel-free graphite shell of spherical nuclear fuel elements for high temperature reactors (therefore referred to as HTR fuel elements). Such fuel elements consist of a graphite matrix with nuclear fuel particles embedded therein surrounded by a fuel-free graphite shell surrounding the graphite matrix containing the fuel particles. These fuel elements usually have a diameter of 6 cm, while the fuel-free graphite shell is 0.5 cm thick.

It is disclosed in German published patent application (DE OS) No. 29 17 437.6 that when such fuel elements are spent, the external graphite shells should be removed, on the one hand to provide a trouble-free preparation and/or to make possible space saving intermediate and final storage of the thus size-diminished fuel elements and, on the other hand, to make it possible to utilize the removed graphite for new fuel elements by treating it to provide a binder matrix for particles containing nuclear fuel. A storage and transport volume reduction of 50% is possible in this way.

For removal of the fuel-free graphite shell rotary ball machines are used that first turn down one half of the graphite shell and after unclamping then turn down the other half. It is possible to obtain operating times of 20 seconds purely for the machining of one element. Apart from the consideration that this time requirement is still relatively long for the desired throughput of 5000 fuel elements per hour, it is noted that difficulties frequently arise in the clamping of the spheres. If, for example, they are deformed, the center of the spheres no longer coincide with the center about which the machining steel tool circles. Clamping and positioning by means of generating a vacuum in order to avoid this difficulty has the problem that the suction is greatly diminished by surface damage effects on the spheres that can be present as the result of corrosion or rolling together of spheres.

The above-described manner of machining off the outer shells of spheres therefore seems poorly suited for large scale operation.

The Invention

It is an object of the present invention to provide an apparatus by which the outer shells of spherical nuclear fuel elements can without trouble be quickly and precisely removed and, further, to provide such an apparatus which to a great extent can be automated.

Briefly, one or more pairs of facing parallel milling disks are provided, preferably coaxially when two or more are provided, at least one disk of the pair being arranged to be driven in rotation and at least one of the pair being actually moveable. At least one of the facing disk surfaces has a hard surface for removal of material. The work space between the pair of disks is closed off by a casing through which means are provided for introduction and removal of spheres through the casing and for removal of the materials ground off from the spheres.

The removal of material from a sphere in the work place is produced by the speed of relative rotation of the disks, the pressure applied by the axially moveable disk and by the nature of the working surfaces bounding the work space. With such an apparatus spherical bodies can be reduced in diameter in a single pass through the apparatus and the apparatus can be constituted in a simple and sturdy structure. The apparatus accordingly is exceptionally well-suited for hot cell operation. Furthermore, high rates of milling can be obtained with unusually small volume of structure. Even elements that are out of round or have surface damage can be reduced to smaller and geometrically round spheres if at the same time other spheres are present in the apparatus. Consequently, the safety spacing necessary to avoid penetration into the zone bearing fuel particles in HTR fuel elements can be kept to a minimum, thus making possible a maximum practical removal of graphite.

The surfaces of the milling disks can be made suitable to the particular sphere material that is to be ground down. For HTR fuel elements a surface has been found suitable that is profiled with substantially radially extending pairing ribs in this case it is particularly advantageous for the ribbed surface to be helical about the common disk axis, rising to one or more down-steps. In this manner the spheres clamped between the milling disks and rolling there are briefly released at the step-shaped slight widenings of the work space, so that the beginning position of a sphere for the next rise of the working surface is changed. In this manner different places on the sphere surfaces are machined, so that the spheres retain their shape. The working can usefully have two or more sectors rising helically from a first to a second level and then dropping back to the first level for the next sector, so as to provide as many changes of initial position of the spheres as possible per revolution.

In order that the outer shells of the spheres to be reduced should not be ground off beyond a certain dimension, at least one stop for the shortest spacing between the winding disks should be provided for the axially moveable disk. In this manner it is assured that the grinding down of HTR fuel elements will not get into the graphite matrix containing the fuel particles. The stop can for example, be a collar on one of the disks in the form of a stop bushing, which can conveniently be provided on the rotary disk.

For the pressing together of the disks there are provided, in accordance with the invention spring means consisting of at least one spring for biasing the axially moveable disk of each disk pair against the opposite grinding disk of the pair. It is desirable for the spring bias to be variable.

Various kinds of springs come into consideration for this purpose, particularly helical springs, but also pneumatically operating springs. The spring or springs can be arranged coaxially to the disk or disks in question. Alternatively thereto a number of springs can also be provided distributed about the periphery of the disks in question.

Preferably each pair of milling disks consists of one rotary machining disk and an axially moveable non-rotary reaction disk. In one embodiment the reaction disk can be made axially moveable by means of an actuation rod extending to the exterior of the apparatus. In that case displacement is provided by pulling on the actuation rod against the spring.

In another embodiment the reaction disk of each pair has fairleads provided by ears having a bore therethrough distributed about its circumference through which axially moveable guide rods are held. This embodiment is particularly useful if a number of pairs of milling disks are arranged adjacent to each other. The springs can then be helical springs around the guide rods or the like and the guide rods are in such case provided with stop collars for pulling each reaction disk away from the copperating milling disk. The rods then also require collars against which the springs can bear.

A particularly compact and high capacity apparatus is provided when a number of milling disk pairs are disposed coaxially in succession in a casing. When the displacement of the axially moveable disks is provided by guide rods as above described, these rods should of course, then extend to serve all pairs of disks and be provided at one end with a common displacement mechanism. At the upper side of the common casing there can be provided for each pair of milling disks at least one opening for admitting work and below at least one discharge opening, while it is desirable in such for the milling disks to be substantially vertical. In order to make possible a controlled introduction of the individual spheres, sluices can be provided at the inlet and outlet openings respectively for admitting or discharging spheres one by one. If the discharge sluice is located near the working space, passage for the material ground off should be provided so that it can continuously be discharged from the working space.

If the discharge opening should serve both for the material ground off as well as for the spheres of finally reduced diameter, it is desirable to separate the spheres from the loose material by providing in the discharge duct a branch equipped with a grid through which the loose material can fall while the spheres are diverted into a separate exit.

The inlet and outlet openings in a particular embodiment can be provided so that when the grinding disks are in operating position, these openings lie behind the axially moveable grinding disk. The axially moveable disk should be removable to the extent necessary to shift the spheres into the working space or out of it. In such case, however, an additional discharge opening is necessary for the discharge of loose material from the working space.

In the embodiment just mentioned, the casing should be inclined towards the openings, so that the spheres can roll out of the working space. In order that a sphere being admitted should not be able to roll out of the discharge opening it is desirable to dimension the inlet and discharge openings and particularly to dimension the discharge opening to the final diameter of the spheres.

Particularly when a number of disk pairs are operated together it is desirable to provide a feed screw conveyor below the discharge openings of the various working spaces for carrying away the loose material after separation from the path of discharge for the spheres.

BRIEF DESCRIPTION OF THE DRAWINGS

The invention is further described by way of illustrative example with reference to the annexed drawings, in which:

FIG. 3 is a side view, partly in longitudinal section of another sphere-paring mill, and FIG. 4 is a cross-section on the line D-E of FIG. 3.

DESCRIPTION OF THE ILLUSTRATED EMBODIMENTS

Figure 1:
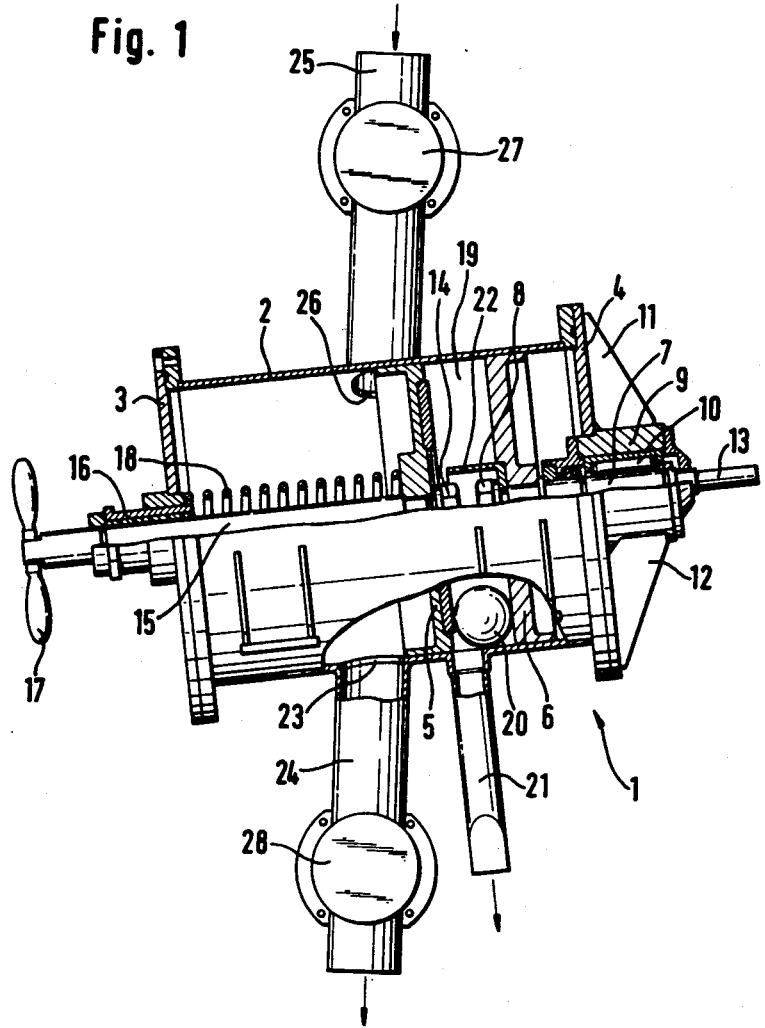
FIG. 1 is a side view, partly in longitudinal section of a sphere-paring mill for HTR fuel elements.

The sphere-paring mill or grinder 1 shown in FIG. 1 has a cylindrical casing closed at its ends by covers 3 and 4.

In the casing 2 are two grinding disks, to wit, a reaction disk 5 shown in this view at the left and a machining disk 6 at the right. The machining disk 6 is fixed on a drive shaft 7 by means of a nut 8 and is rotatably mounted in a bearing bushing 9 of the cover 4 by means of a roller bearing 10. The bearing bushing 9 is additionally held by stiffening ribs 11 and 12. The drive shaft 7 projects externally with a stub end 13 and can there be provided with driving means, for example, an electric motor.

The reaction disk 5 is nonrotary, but is axially shiftable. It is held by means of a nut 14 on a guiding axle rod 15 which is guided in a bushing 16 in the cover 3, beyond which its projecting end is equipped with a hand grip 17. The guide shaft 15 is surrounded by a helical spring 18 which bears at one end on the cover 3 and at the other end at the back of the reaction disk 5. It is designed as a compression spring and accordingly is biased to press the reaction disk 5 against the machining disk. The bias of the helical spring 18 can be provided to fit the requirement of the particular operation.

The mutually facing surfaces of the reaction and machining disks 5 and 6 enclose, together with the casing, a working space 19. The surface of the machining disk 6 is specially shaped as shown in more detail in FIG. 2. The surface of the reaction disk 5 also has roughnesses to promote removal of material from the work spheres.

Just one sphere 20 is shown in the work space 19. By the effect of the helical screw 18 it is subjected to pressure and rolled during the driving of the machining disk 6 on the two surfaces while the outer layer or shell is milled away. The loose material produced by the grinding falls out of the work space 19 through a detritus discharge channel 21 covered with a sieve. This loose material can be collected and utilized for the production of the graphite matrix of new fuel elements.

The milling procedure is ended when the diameter of the sphere 20 has become so small that a collar 22 seated on the drive shaft 7 and projecting into the work space 19 comes to abut on the opposed surface of the reaction disk 5.

In this manner the spacing between the reaction and machining disks 5 and 6 is prevented from becoming any smaller, for if it did there would be the undesirable result that the graphite matrix with the particles embedded therein would be attacked. After termination of the milling operation the reaction disk 5 is pulled away from the machining disk 6 by means of the hand grip 17 far enough to make free a discharge opening 23 connected to a discharge pipe 24. Because of the gentle inclination of the machine 1 the sphere rolls simply by gravity into the discharge channel 24.

A new sphere can then be introduced through an entrance pipe 25 and an entry opening 26. Previously the reaction disk 5 is moved again somewhat in the direction towards the machining disk 6, up to the left hand edge of the entry opening 26, in order to prevent the new sphere 20 from directly going into the discharge pipe 24 or becoming lodged in its mouth. After introduction of the sphere 20 the reaction disk 5 is again moved against the machining disk 6 far enough to cause the sphere 20 to be clamped between the disks 5 and 6. The milling or grinding operation can then begin anew.

The entrance and discharge pipes 24 and 25 respectively have admission and removal sluices 27 and 28. These provide the possibility of allowing only only sphere to pass at a time and at all other times blocking the pipe.

Figure 2:
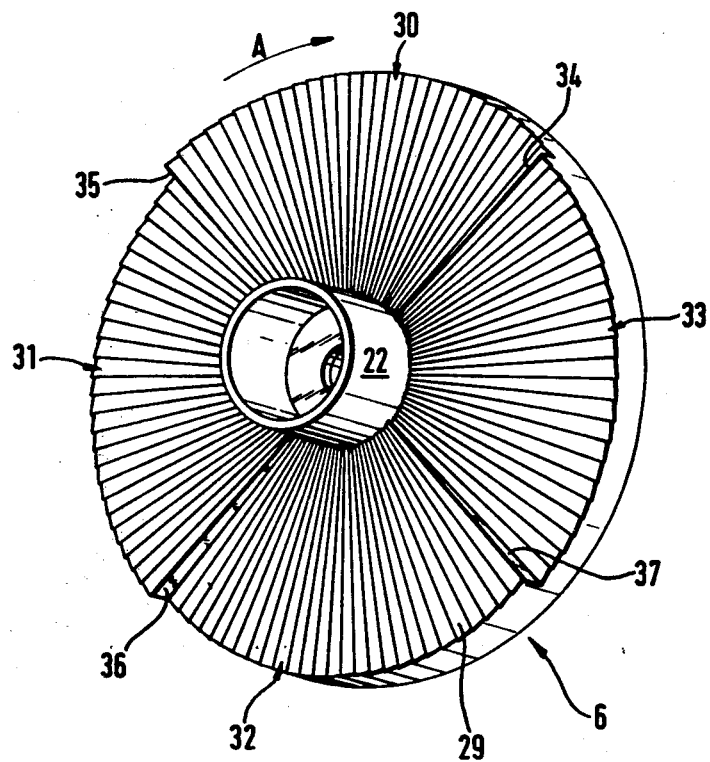
FIG. 2 is a perspective view of a grinding disk of the mill of FIG. 1.

FIG. 2 shows the working surface of the machining disk 6 of FIG. 1 and its stop collar 22 in a perspective view. The surface has paring ribs 29 running out from the center in a radiating pattern. These provide the material removal effect. They are arranged in four sectors 30, 31, 32 and 33 with the general disposition of the surfaces of the individual sectors 30, 31, 32 and 33 being helical so that as the disk turns in the direction of rotation indicated by the arrow A, the radially patterned surfaces passing a particular point rise up to a downstep 34, 35, 36 or 37 at which the particular sector 30, 31, 32 or 33 ends.

By these steps a sphere rolling circumferentially on the machining disk 6 is briefly set free and received another position for the next of the sectors 34, 35, 36 and 37, so that a uniform material removal results with maintainance of the spherical shape. In cooperation with the stop collar 22 an exact round removal can be obtained with the possibility of going very close to the graphite matrix in which the fuel elements are embedded.

The sphere-paring mill 38 shown in FIG. 3 is equipped with five milling units, of which the middle one in this figure is illustrated in cross-section in FIG. 4. The milling units can be recognized by the five input pipes 39, 40, 41, 42 and 43 and likewise the five discharge pipes 44, 45, 46, 47 and 48, all of which are affixed to the cylindrical common casing 49 made of an upper casing portion and a lower casing portion which are screwed together. The casing 49 is closed off at the ends by covers 50 and 51.

In the region of the middle milling unit the drive shaft 52 is to be seen, which has a shaft stub 53 which projects out of the casing 49 at the left side. A motor can be connected there.

In this milling unit a machining disk 54 is fixed together with a spacing collar 55 on the drive shaft 52. To the right therefrom in this view a reaction disk 56 is mounted the guiding of which is further described below. It has a passage hole in the middle for the passage of the drive shaft 52. Between the two disks 54 and 56 is shown just one sphere 57, the outer shell of which is ground off during operation of the drive shaft 52.

The corresponding input and discharge pipes 41 and 46 respectively contain input and discharge sluices 58 and 59 that are made in the form of rotatable cylinders as is indicated by the arrows B and C. In these cylinders radially oriented blind bores 60 and 61 are provided for accepting a sphere therein. The input and discharge sluices 58 and 59 are shown just in their closed position, so that the blind bores 60 and 61 are open respectively towards the input and discharge pipes 41 and 46, while the closed cylinder wall of the sluices 58 and 59 form a part of the wall of the working space 62. In order that in this position they would not project into the working space 62, they have depressions milled into them at the right place with the radius of the working space 62.

FIG. 4 shows a cross-section of the milling unit just described, the section being made along the line D–E of FIG. 3. It can be seen that the reaction disk 56 has, in all, four ears 63, 64, 65 and 66 projecting out of the casing 49 which are provided with holes for passing guide rods 67, 68, 69 and 70 running perpendicularly to the plane of the drawing of this figure. By these guide rods the reaction disks are held coaxially in the machine. The drive shaft is surrounded, in the illustrated section, by the spacing collar 55. The cylindrical input and discharge sluices 58 and 59 with the blind bores 60 and 61 are to be seen respectively in the input tube 41 and the discharge tube 46. The blind bore 60 in the input channel 41 is so dimensioned that only one sphere will fit in it. By rotation of the input sluice 58 around an axis running perpendicular to the plane of the drawing of this figure, the sphere can be introduced into the working space without any possibility that another sphere can roll in after it.

The discharge sluice 59 functions in the same way. With it one sphere can be led out of the working space 62. It then rolls, at first perpendicularly down the discharge pipe 46. The latter has a widening 71 that branches off to one side into which the sphere, passing over an oblique grid 72 is led off to the side as shown by the arrow F, while the loose material likewise coming out of the working space 62 falls through the grid 72 into a feed screw conveyor 73. The loose material, moreover, can continuously fall out of the working space 62, since the closed side of the discharge sluice 59 has suitable perforations for the purpose which are not visible in the figure. The other four milling units also have the features described above with reference to the middle milling unit, in identical form, so that the description of the other milling units may be dispensed with here.

It can also be seen in FIG. 3 that the feed screw conveyor 73 extends over the entire length of the sphere-paring miller 38 and all of the discharge pipes discharge into it. In this manner the loose material removed from the spheres is collected and can be removed through the outlet 74 as indicated by the arrow G. The collection place for the spheres is not shown here.

In FIG. 3 the way in which the guide rods 69 and 70 on the visible side of the machine can also be seen. They extend over the entire length of the sphere-paring miller 38, so that they serve for the positioning and guiding of all reaction disks and are mounted in the covers 50 and 51 for axial movement indicated by the double arrows H and I. For the understanding of the function of the guide rods 65 and 70 it is sufficient in the view shown to observe just the milling unit located at the right end of the machine, since the arrangement and function are repeated for each milling unit.

The guide rods 69 and 70 are provided with spring-stop collars 75 and 76 for each milling unit. The helical springs 77 and 78 encircling the rods 69 and 70 bear at one end against the stop collars 75 and 76 and at the other end against the ears 79 and 80 of the corresponding reaction disk 81 which projects out of the casing 49. By these helical springs 77 and 78 the reaction disk 81 is pressed in the direction towards the machining disk opposite it which is not visible in this particular case but is constituted in exactly the same way as the machining disk of the middle milling unit shown in longitudinal section, so that a spherical body introduced between the two disks is milled or ground down with a rotation of the machining disk.

On the side of the ears 79 and 80 facing away from the helical springs 77 and 78 the guide rods 69 and 70 have disk-engaging collars 82 and 83. By movement of the guide rods 69 and 70, to the right in FIG. 3, the reaction disk 81 can be pulled away from the corresponding machining disk when the milling operation is completed. Since the construction is the same in the other milling units of the apparatus shown in FIG. 3, at the same time the reaction disks in those units are also pulled away. After each removal of spherical bodies out of the work spaces and the introduction of new spherical bodies thereinto, the guide rods 69 and 70 are again moved, to the left in this figure, for such a distance that the ears 79 and 80 have a spacing from the disk positioning collars 82 and 83 to bring the reaction disk 81 to lie against the collars 82 and 83 only after complete milling of the outer shell of the sphere. These stop collars 82 and 83 therefore serve for prevention of further milling when the desired diameter has been reached. By shifting of the spring-stop collars 75 and 76 the bias of the helical springs 77 and 78 can changed.

The above-described sphere-paring mill 38 can be constituted quite easily to provide automatic milling operations, for example, in a hot cell, at a high throughput of spherical fuel elements. In this manner, in spite of low rate of shaft evolution very short machining times for the individual spherical elements can be obtained.

Although the invention has been described with reference to particular illustrative embodiments, it will be understood that further variation and modifications may be made within the inventive concept.

I claim:

1. Apparatus capable of grinding off the outer graphite shell of spherical HTR nuclear fuel elements comprising:
   at least one pair of substantially parallel milling disks (5,6; 54,56) on an axis sufficiently close to the horizontal to allow particle material to drop out from between the disks, said disks facing each other across a work space, at least one of said disks having on its surface facing said work space (19,62) a hard helical radially ribbed surface for removing material from the surface of spherical bodies in said work space by relative grinding action, said radially ribbed helical surface rising to at least one radial down-step and being helical with respect to said axis;
   means for driving at least one of said disks to produce relative rotation of said disks about an axis crossing said work space in such a manner that spherical bodies between said disks tend to move up said radially ribbed surfaces to and past said at least one down-step;
   means for displacement of at least one of said disks along said axis;
   a casing (2,49) enclosing the periphery of said work space;
   means for admitting, to said work space through said casing, spherical bodies of a size to be ground therein;
   means for discharging spherical bodies from said work space through said casing, and
   means for discharging loose material resulting from grinding from said work space through said casing.

2. Apparatus as defined in claim 1, in which said hard surface has a plurality of sectors in each of which a helical surface (30,31,32,33) rises from a first to a second level and a down-step (34,35,36,37) from said second to said first level is provided at each boundary between said sectors.

3. Apparatus as defined in claim 1 or 2, in which spacer means (22,55) are provided for setting a minimum distance between said disks for limiting the extent to which spherical bodies may be ground down in the apparatus.

4. Apparatus as defined in claim 3, in which said spacer means is in the form of a collar (22,55) provided on one of said disks (6,54).

5. Apparatus as defined in claim 4, in which one of said disks is axially movable and otherwise stationary, and the other is rotary, and in which said collar (22,55) is provided on said rotary disk (6,54).

6. Apparatus as defined in claim 3, in which a single one of said disks (5,56) is axially movable, and in which spring means (18;77,78) are provided for urging said axially movable disk (5,56,81) against the opposing rotary disk (6,54).

7. Apparatus as defined in claim 6, in which means are provided for varying the bias force of said spring means (18;77,78).

8. Apparatus as defined in claim 6, in which said spring means (18) are disposed coaxially with respect to said axially movable disk (5).

9. Apparatus as defined in claim 6, in which said spring means are composed of a plurality of springs (77,78) distributed about the periphery of said axially movable disk (81).

10. Apparatus as defined in claim 6, in which one of said disks (6,54) is a rotary disk arranged to be driven in rotation and the other of said disks (5,56) is a non-rotatable reaction disk which is axially movable.

11. Apparatus as defined in claim 10, in which an actuating rod (15) is provided for moving axially said non-rotary disk (5).

12. Apparatus as defined in claim 11, in which said spring means (18) are seated on said rod (15).

13. Apparatus capable of grinding off the outer graphite shell of spherical HTR nuclear fuel elements comprising:
   a plurality of pairs of substantially parallel milling disks (5,6; 54,56) facing each other respectively across a plurality of work spaces enclosed by a common casing, at least one of said disks of each pair having on its surface facing a said work space (19,62) a hard surface for removing material from the surface of spherical bodies in said work space by relative grinding action,
   means for driving one disk of each said pair of produce rotation thereof about an axis crossing said work spaces, the other disk of each said pair being a non-rotatable reaction disk, said non-rotatable disks of the respective pairs having pierced guide ears (63,64,65; 79,80) distributed about their respective peripheries;
   means including movable guide rods passing through said guide ears for providing common axial movement of said non-rotatable reaction disks;
   spring means (18; 77,78) for urging said axially movable disks against the respective opposing rotary disks;
   spacer means (22,55) for setting a minimum distance between the disks of each of said pairs of disks;
   means for admitting, to each of said work spaces through said casing, spherical bodies of a size to be ground therein;
   means for discharging spherical bodies from each of said work spaces through said casing, and means for discharging loose material resulting from grinding, from each of said work spaces, through said casing.

14. Apparatus as defined in claim 13, in which said spring means (77,78) are provided around said guide rods (67,68,69,70), and also stops (82,83) therefor, for urging said non-rotary disks against the respective other disks of said pairs and for allowing retraction of said non-rotary disks away from said other disks against spring force.

15. Apparatus as defined in claim 14, in which said guide rods (67,68,69,70) are provided with stop shoulders (75,76) against which said spring means (77,78) bear.

16. Apparatus as defined in claim 13, in which said guide rods (67,68,69,70) extend over all of said disk pairs, said pairs being coaxially aligned, and at one end said guide rods are provided with a common guide rod displacement mechanism.

17. Apparatus as defined in claim 13, in which said disks of said pairs are mounted substantially vertically.

18. Apparatus as defined in claim 1, in which said means for discharging spherical bodies includes a rotary plug located near said work space, with one side open for reception or discharge of a spherical body and one side arranged to block entrance or removal of a spherical body, while having apertures permitting the passage of loose material and constituting said means for discharging loose material from said work space.

19. Apparatus as defined in claim 13, in which said means for discharging spherical bodies includes a rotary plug located near each said work space with one side open for reception or discharge of a spherical body and one side arranged to block entrance or removal of a spherical body, while having apertures permitting the passage of loose material and constituting said means for discharging loose material from said work space.

20. Apparatus as defined in claim 1, in which said means for admitting spherical bodies includes a rotary plug with one side open for reception or discharge of a spherical body, and one side arranged to block entrance or removal of a spherical body.

21. Apparatus as defined in claim 13, in which said means for admitting spherical bodies includes a rotary plug with one side open for reception or discharge of a spherical body, and one side arranged to block entrance of removal of a spherical body.

22. Apparatus as defined in claim 19, in which in said means for discharging spherical bodies, below each said rotary plug, there is provided a branch discharge channel equipped with a grid (72) for separation of discharged spherical bodies from loose material.

23. Apparatus as defined in claim 1, in which the outlet openings of said admitting means and the entrance opening of said spherical body discharging means lie on the other side of said axially movable disk from said work space in the operating position of said disks, and in which said displacing means is capable of an extent of movement to allow an entering spherical body to come in front of said axially movable disk for bringing it into said work space and to allow a completely treated spherical to go out of said work space and into said discharging means, and in which apparatus said means for discharging loose material is separate from said means for discharging spherical bodies and communicates directly with said work space.

24. Apparatus as defined in claim 23, in which said casing and said axis are inclined downwards towards an entrance opening of said spherical body discharging means.

25. Apparatus as defined in claim 23, in which said entrance opening of said spherical body discharging means is so dimensioned and so disposed with reference to said discharge opening of said admitting means as to prevent the possibility of a spherical body admitted by said admitting means rolling out directly through said spherical body discharging means.

26. Apparatus as defined in claim 19, in which a feed through conveyor (73) is provided running below the loose material discharge outlets of said means for discharging loose material from each of said work spaces, for collecting the loose material discharged from each of said work spaces after separation from the spherical bodies discharged therefrom and transporting said loose material to a common disposition location.

* * * * *